(12) United States Patent
Sedayao (10) Patent No.: US 10,762,208 B2
(45) Date of Patent: Sep. 1, 2020

(54) SYSTEM AND METHOD FOR REGAINING OPERATIONAL CONTROL OF COMPROMISED REMOTE SERVERS

(71) Applicant: Intel Corporation, Santa Clara, CA (US)

(72) Inventor: Jeffrey C. Sedayao, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 14/752,629

(22) Filed: Jun. 26, 2015

(65) Prior Publication Data
US 2016/0378991 A1    Dec. 29, 2016

(51) Int. Cl.
*G06F 21/57*    (2013.01)
*G06F 9/4401*    (2018.01)
*G06F 21/56*    (2013.01)

(52) U.S. Cl.
CPC .......... *G06F 21/575* (2013.01); *G06F 9/4416* (2013.01); *G06F 21/56* (2013.01); *G06F 21/57* (2013.01)

(58) Field of Classification Search
CPC ...... G06F 21/575; G06F 9/4416; G06F 21/57; G06F 21/56
See application file for complete search history.

(56) References Cited

U.S. PATENT DOCUMENTS

| | | | | |
|---|---|---|---|---|
| 7,058,974 B1 * | 6/2006 | Maher, III | ............... | H04L 47/22 370/229 |
| 2004/0095897 A1 * | 5/2004 | Vafaei | ..................... | H04L 29/06 370/254 |
| 2004/0141461 A1 * | 7/2004 | Zimmer | ............... | H04L 41/0663 370/216 |
| 2008/0109889 A1 * | 5/2008 | Bartels | ................ | H04L 63/0428 726/7 |
| 2010/0070800 A1 * | 3/2010 | Hanna | .................... | G06F 21/575 714/6.12 |
| 2013/0191897 A1 * | 7/2013 | Lindteigen | ............... | G06F 21/45 726/6 |
| 2013/0291085 A1 * | 10/2013 | Chong | ..................... | H04L 9/321 726/10 |
| 2014/0025941 A1 * | 1/2014 | Bulusu | .................. | G06F 9/4401 713/2 |
| 2014/0250290 A1 * | 9/2014 | Stahl | ...................... | G06F 21/575 713/2 |
| 2015/0033004 A1 * | 1/2015 | Smeets | .................... | G06F 21/57 713/2 |
| 2016/0019116 A1 * | 1/2016 | Gopal | .................. | G06F 11/1417 714/19 |

OTHER PUBLICATIONS

Brett, et al., "Securing the PlanetLab Distributed Testbed," 2004 Lisa XVII, Nov. 14, 19, 2004, 7 pages, Atlanta, Georgia, USA.

* cited by examiner

*Primary Examiner* — Jaweed A Abbaszadeh
*Assistant Examiner* — Gayathri Sampath
(74) *Attorney, Agent, or Firm* — International IP Law Group, P.L.L.C.

(57) ABSTRACT

An apparatus is described herein. The apparatus includes a secure enclave, and the secure enclave comprises a scanning mechanism and a reboot mechanism. The apparatus also includes a negotiation module, wherein the negotiation module is to negotiate a packet type and a payload for a reboot packet and in response to the scanning mechanism detecting the reboot packet the reboot mechanism is to reboot a computing device.

25 Claims, 4 Drawing Sheets

SYSTEM AND METHOD FOR REGAINING OPERATIONAL CONTROL OF COMPROMISED REMOTE SERVERS

TECHNICAL FIELD

The present technique relates generally to regaining control of a remotely placed server or a computing device. More specifically, the present techniques relate to a lightweight and secure method for regaining operational control of compromised remote computing devices.

BACKGROUND ART

Computing devices are often connected via a network to share resources across a number of computing devices. In a networked computing environment, any number of computing devices belonging to many users are connected together such that resources are pooled and each computing device can communicate other computing devices. Networked computing also enables remote management of networked computing devices, as well as networked security management of networked security devices.

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Computing devices are often compromised and infected by malware. As used herein, malware includes any sort of malicious code, including but not limited to computer viruses, worms, rootkits, Trojans, and spyware. It can be straightforward to regain control of a server or other kind of computing device that is under physical control and proximately located near the person attempting to remove the malware, regaining control of a remotely placed server or a mobile computing device can be prevented by the malware. Essentially, malware can intercept any efforts to regain control of the computing device by intercepting incoming network traffic.

Embodiments described herein enable a lightweight and secure method for regaining operational control of compromised remote computing devices. In embodiments, a packet scanning and reboot command mechanism is located in trusted execution environment. The mechanism can reboot a server or other remotely located computing device into a known safe state when a certain type of packet cryptographically signed by a management server is received in an OS.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present invention. It will be apparent, however, to one skilled in the art that these specific details need not be employed to practice the present invention. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present invention.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the invention described herein.

Figure 1:
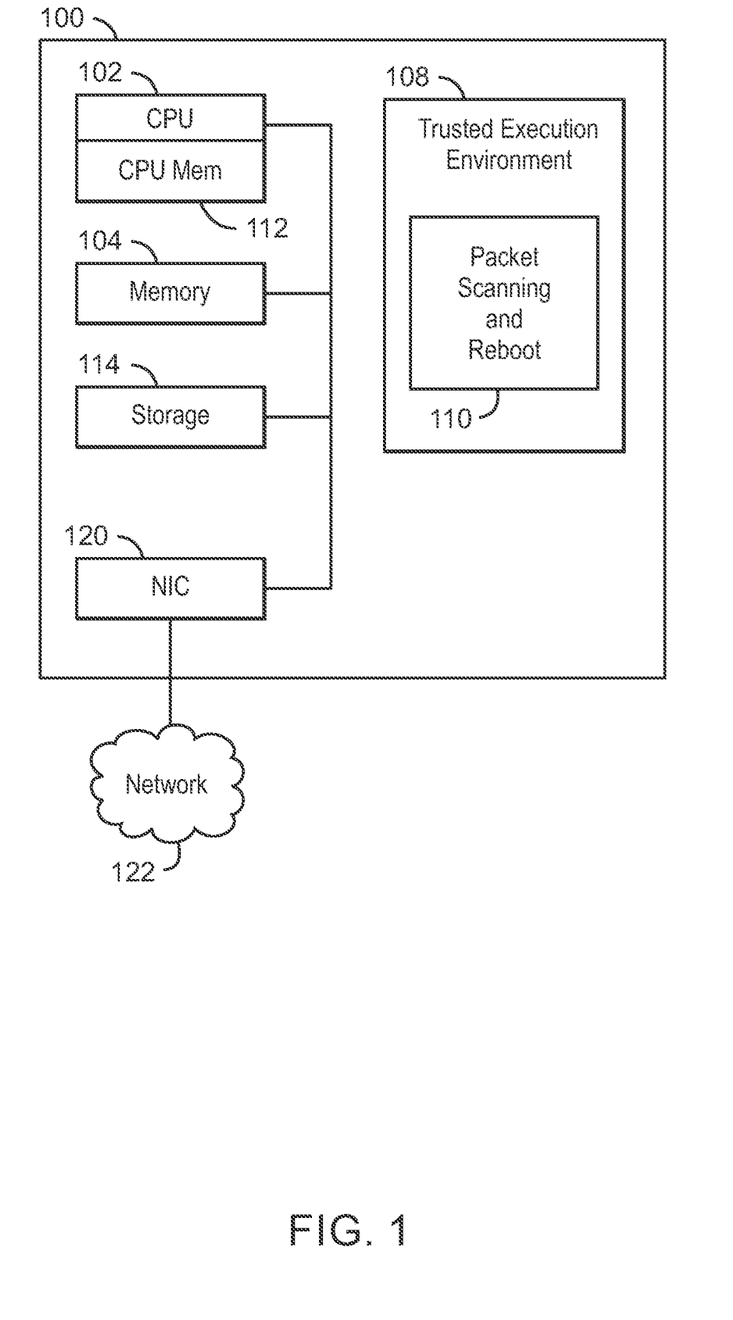
FIG. 1 is a block diagram of a system with a trusted execution environment.

FIG. 1 is a block diagram of a system 100 with a trusted execution environment. The system 100 may be components of, for example, a laptop computer, desktop computer, Ultrabook, tablet computer, mobile device, or server, among others. The system 100 may include a central processing unit (CPU) 102 that is configured to execute stored instructions, as well as a memory device 104 that stores instructions that are executable by the CPU 102. The CPU may be coupled to the memory device 104 by a bus 106. Additionally, the CPU 102 can be a single core processor, a multi-core processor, a computing cluster, or any number of other configurations. Furthermore, the system 100 may include more than one CPU 102. The memory device 104 can include random access memory (RAM), read only memory (ROM), flash memory, or any other suitable memory systems. For example, the memory device 104 may include dynamic random access memory (DRAM).

The CPU 102 may be connected through the bus 106 to a trusted execution environment 108. The trusted execution environment is an isolated environment that enables protection and security of code and devices of a system or platform. The trusted execution environment is independent of the host operating system, and can include both hardware and software components. In some example, the trusted execution environment is a processor of the host, such as a dedicated secured environment management engine (ME). The trusted execution environment may also be a Software Guard Extension (SGX). In embodiments, the SGX is to set aside private regions of code and data. In this manner, sensitive data can be protected from any malware and unauthorized software.

A trusted execution environment 108 is to enable a trusted execution environment for a packet scanning and reboot mechanism 110. In some embodiments, the secured environment may be a separate compute environment, complete with its own CPU, memory, and other compute environment functionality. In some embodiments, the CPU 102 includes a private memory 112 that is non-shared. The private memory 112 includes code for rebooting into a known state into code can also be burned into the private memory of the processor. In this manner, unauthorized software cannot tamper with the code for rebooting into a known state. The system 100 may include a storage device 114. The storage device 114 can be a physical memory such as a hard drive, an optical drive, a thumb drive, an array of drives, or any combinations thereof. The storage device 114 may also include remote storage drives. In embodiments, the code to reboot the system into a known state can be located on the storage device 114 or any remote storage drive.

In embodiments, a machine-readable medium may store the instructions for rebooting into a known state. The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, the instructions for rebooting into a known state may be downloaded as a computer program (e.g., BIOS) which may be transferred from a remote computer (e.g., a server) to a requesting computer (e.g., a client) by way of data signals via a communication link (e.g., a modem or network connection). Accordingly, the system 100 may also include a wired or wireless network interface controller (NIC) 120 may be configured to connect the system 100 to a network 120. The network 120 may be a wide area network (WAN), local area network (LAN), or the Internet, among others.

It is to be understood that the block diagram of FIG. 1 is not intended to indicate that the system 100 is to include all of the components shown in FIG. 1. Rather, the system 100 can include fewer or additional components not illustrated in FIG. 1. Furthermore, the components may be coupled to one another according to any suitable system architecture, including the system architecture shown in FIG. 1 or any other suitable system architecture that uses a data bus to facilitate secure communications between components.

In order to regain control of a compromised remote computing device, the packet and reboot mechanism is to perform and control the reboot into a known state. The packet and reboot mechanism is isolated by a trusted execution environment. The environment is to create a secure enclave for execution of the packet and reboot mechanism. The secure enclave is to protect sensitive data from unauthorized access or modification by rogue software running, while preserving the confidentiality and integrity of sensitive code and data without disrupting the ability of legitimate system software to schedule and manage the use of platform resources. The secure enclave will not prevent the owner of the remote computing device from controlling of their computing device, and the owner can install and uninstall applications and services as desired.

Figure 2:
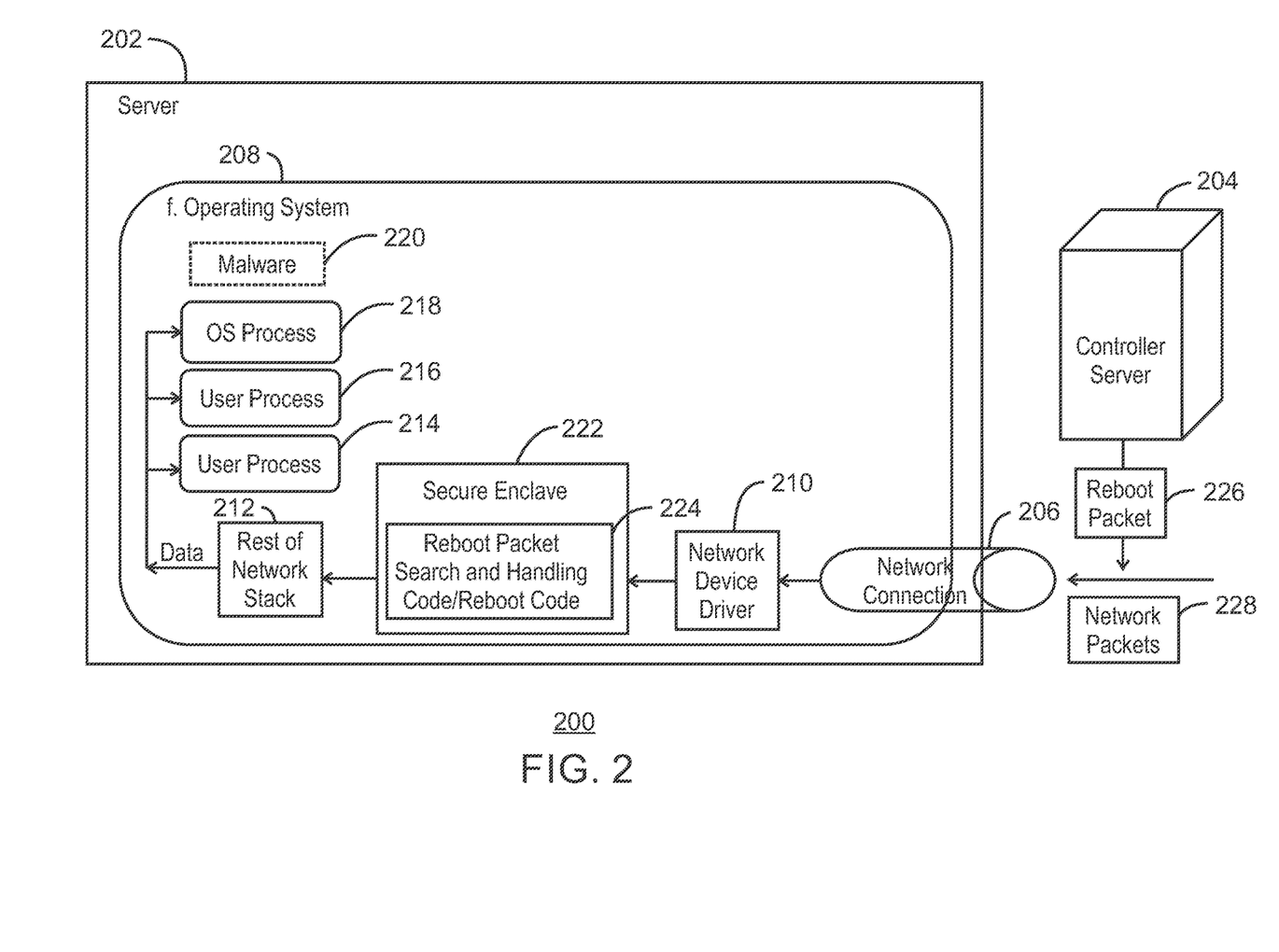
FIG. 2 is a block diagram of a system with a secure enclave.

FIG. 2 is a block diagram of a system 200 with a secure enclave. A computing device 202 is illustrated as a device not under physical control of a user that can access the device when it is compromised. A controller server 204 is networked with the computing device 202. In embodiments, the computing device 202 is a remote server. Under typical operation, the controller server can transmit packets of data to the server 202 via a network connection 206. The network connection may be, for example, a NIC 120 (FIG. 1).

Data packets may be stored in a buffer as they are as they are transmitted to the server 202. In embodiments, a NIC can write each data packet into the memory of the NIC. The network connection 120 can retrieve the data packet from buffer and transfer the packet to a host memory buffer via a network stack provided by the operating system 208. A network device driver 210 then validates the data packet, and sends the packet through the remaining network stack layers 212. In embodiments, the remaining networking stack layers include, Ethernet, the Transmission Control Protocol and the Internet Protocol (TCP/IP) layer, and an Application Layer. The Application Layer includes a user process 214 and a user process 216. The Application layer also includes operating system (OS) processes 218. Under typical operations, the server 202 operates as described and data is transferred successfully to and from the controller server 204, without being corrupted or intercepted by unauthorized software. The packet and strings for remote reboot are negotiated periodically to make packet filtering attacks more difficult and reduce the impact of denial of service attacks through capturing and resending reboot packets 226. A packet that that includes commands for a remote reboot is known as a reboot packet.

In the case of malware 220 or any other unauthorized software, the server 202 may be compromised and typical operation of the server may cease. The malware 220 may attempt to scan incoming network packets 228 in order to intercept a reboot packet, which would provide commands to reboot the system to a known state. In embodiments, the reboot packet type is periodically negotiated in order to prevent the malware from filtering through the incoming packets in order to intercept the reboot packet. The server 202 also includes a packet scanning and reboot mechanism 224, which is a lightweight mechanism for securely and remotely rebooting servers and other computing platforms even if those platforms have comprised operating systems or other malware. The packet scanning and reboot mechanism 224 is protected by a secure enclave 222. In embodiments, the secure enclave is an SGX Enclave 222.

The secure enclave is a trusted and secure computing environment in which an executable software application and data can be stored and executed. The secure enclave may be located on a processor, such as the CPU 102 (FIG. 1). In embodiments, the secure enclave is located on an isolated processor of the server 202. The secure enclave may include hardware level instructions. The secure enclave is lightweight in that it enables the packet and reboot mechanism to scale with the capabilities of the underlying application processor. Moreover, the secure enclave enables the packet and reboot mechanism to be a secure region of code and data that is maintained confidentiality, even when an attacker has physical control of the platform and can conduct direct attacks on memory.

Figure 3:
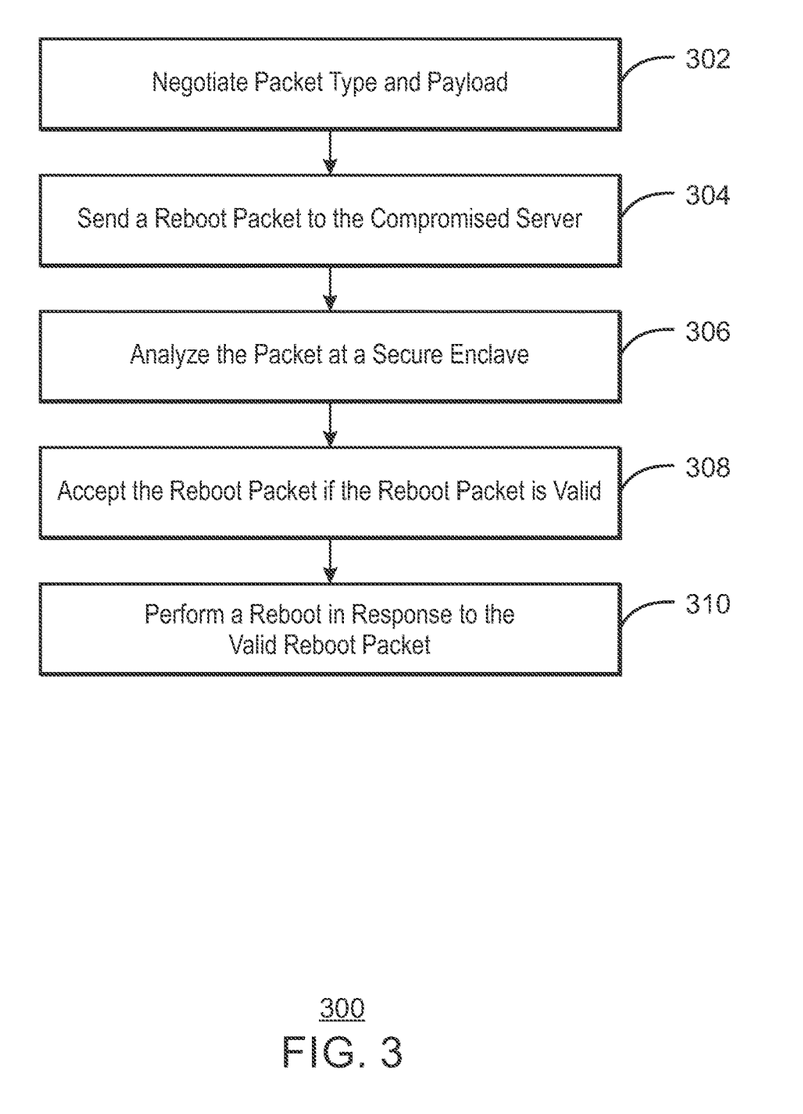
FIG. 3 is a process flow diagram of a method for regaining operational control of compromised remote servers.

FIG. 3 is a process flow diagram of a method 300 for regaining operational control of compromised remote servers. At block 302, the reboot packet type and payload is negotiated. In embodiments, the controller server can negotiate with the secured enclave for the reboot packet type and payload. The reboot packet type can be changed as necessary to prevent detection by the malware or unauthorized software. Accordingly, the remote server or other computing device not under physical control has packet handling code that negotiates with the controller server regarding the type and content of packet it will use as a trigger to reboot. In embodiments, the packet is signed with a private key of the controller server and will include a time stamp and potentially some agreed upon string. This negotiation prevents a replay attack (e.g. replaying a reboot packet) that could be used as a Denial of Service attack (DOS through constant rebooting), since each reboot packet will be unique between each controller server and each system and each reboot packet will be used only once. In embodiments, public key encryption is used so that the packet and reboot mechanism can access the corresponding public key and validate that the packet came from the controller server. Since the packet type is negotiated, malware can infect server, but the malware cannot read or modify the packet scanning/reboot code. Even if the malware compromised the network driver, it cannot selectively filter out the reboot packets because the malware cannot determine what packets to filter.

At block 304, a reboot packet 226 is sent by the controller server to the remote server or other computing device not under physical control. In embodiments, when an administrator determines that server has been compromised, the administrator can send the remote server a reboot packet. At block 306, the reboot packet is received by the secure enclave. In response to receiving the reboot packet, the reboot packet is analyzed by the secure enclave. If the reboot packet 226 is valid, a reboot is triggered by the reboot packet, and the server boots into a known state. The validity of the reboot packet may be determined via cryptographic protocols, such as public key encryption. At block 308, the valid reboot packet is accepted. Accepting the valid reboot packet includes unpacking the reboot packet and corresponding payload. Accepting the valid reboot packet also includes determining the physical location of the read-only media for reboot. The media for reboot may be a CD, flash memory, burned in code, and the like. At block 310, a reboot is performed in response to the valid packet.

Although the blocks in the flowchart with reference to FIG. 3 are shown in a particular order, the order of the actions can be modified. Thus, the illustrated embodiments can be performed in a different order, and some actions/blocks may be performed in parallel. The numbering of the blocks presented is for the sake of clarity and is not intended to prescribe an order of operations in which the various blocks must occur. Additionally, operations from the various flows may be utilized in a variety of combinations.

Figure 4:
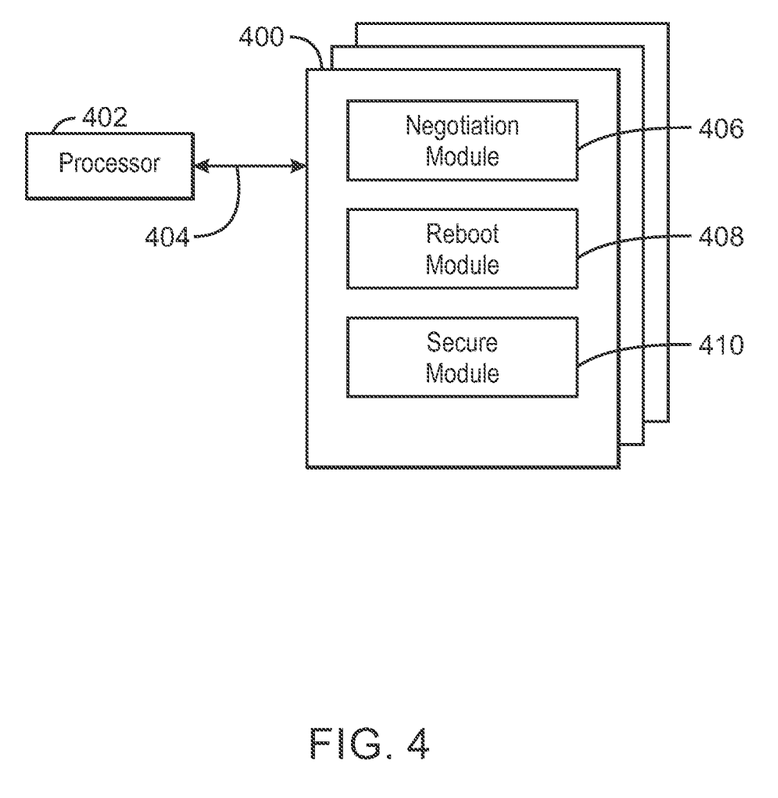
FIG. 4 is a block diagram showing tangible, non-transitory computer-readable media that stores code for regaining operational control of compromised remote servers.

FIG. 4 is a block diagram showing tangible, non-transitory computer-readable media 400 that stores code for regaining operational control of compromised remote servers. The tangible, non-transitory computer-readable media 400 may be accessed by a processor 402 over a computer bus 404. Furthermore, the tangible, non-transitory computer-readable medium 400 may include code configured to direct the processor 402 to perform the methods described herein.

The various software components discussed herein may be stored on one or more tangible, non-transitory computer-readable media 400, as indicated in FIG. 4. For example, a negotiation module 406 may be configured to negotiate the reboot packet type and payload. A reboot module 408 may be configured to reboot when the reboot packet 226 is received by the compromised server. A secure module 410 may be configured to analyze the packet via a reboot packet validation mechanism located on a secure enclave.

The block diagram of FIG. 4 is not intended to indicate that the tangible, non-transitory computer-readable media 400 is to include all of the components shown in FIG. 4. Further, the tangible, non-transitory computer-readable media 400 may include any number of additional components not shown in FIG. 4, depending on the details of the specific implementation.

Example 1

An apparatus for regaining operational control of compromised remote servers is described herein. The apparatus comprises a secure enclave and a negotiation module. The secure enclave comprises a scanning mechanism and a reboot mechanism. The negotiation module is to negotiate a packet type and a payload for a reboot packet and in response to the scanning mechanism detecting the reboot packet the reboot mechanism is to reboot a computing device.

In examples, the reboot packet type may be iteratively changed based on a negotiation with a controller server. The secure enclave may be a trusted execution environment. The scanning mechanism may receive the reboot packet from a controller server. Additionally, the scanning mechanism may scan network data for the reboot packet. Payload may comprise reboot code. The reboot code may be located on a physical media including CD, DVD, flash, or any combination thereof. Further, in examples, the reboot code may be located burned into a private memory of a processor. The computing device may be compromised in response to a malware or an unauthorized software. The packet type may be undetectable by the malware.

Example 2

A method for regaining operational control of compromised remote servers is described herein. The method comprises negotiating a reboot packet type and payload and receiving a reboot packet from a controller server. The method also comprises analyzing the reboot packet at a secure enclave.

A compromised server may be rebooted to a known state in response to analyzing the reboot packet at a secure enclave. The reboot packet may be iteratively changed in response to the negotiation. The network traffic may be scanned to detect the reboot packet. Further, the payload may be code to reboot a compromised server to a known state. The secure enclave may be scaled based on a processor of a compromised server. In examples, a reboot packet may be sent from the controller server to a compromised server. Analyzing the reboot packet may include verifying the reboot packet via public key encryption. The reboot packet may be signed with a private key of the controller server. The reboot packet may comprise a time stamp and a string negotiated by the compromised server and the controller server.

Example 3

A system for regaining operational control of compromised remote servers is described herein. The system comprises a network connection, a memory, and a processor. The memory is to store instructions and that is communicatively coupled to the network connection. The processor is communicatively coupled to the network connection and the memory. When the processor is to execute the instructions, the processor is to negotiate a reboot packet type and payload via a reboot and scanning mechanism within a secure enclave and receive a reboot packet. Also, when the processor is to execute the instructions, the processor is to analyze the reboot packet at the secure enclave.

In examples, the reboot packet type may be iteratively changed based on a negotiation with a controller server. The secure enclave may be a trusted execution environment. The scanning mechanism may be receive the reboot packet from a controller server. Further, in embodiments, the scanning mechanism scans network data for the reboot packet. The payload may comprise reboot code. A reboot may be performed based on a valid reboot packet. A reboot code for the reboot may be located burned into a private memory of a processor or located on a physical media including CD, DVD, flash, or any combination thereof. Analyzing the reboot packet may comprise determining if the reboot packet may be valid. A packet type may be undetectable by a malware.

Example 4

An apparatus for regaining operational control of compromised remote servers is described herein. The apparatus comprises a means to secure a scanning mechanism and a reboot mechanism and a negotiation module. The negotiation module is to negotiate a packet type and a payload for a reboot packet and in response to the scanning mechanism detecting the reboot packet the reboot mechanism is to reboot a computing device.

In embodiments, the reboot packet type may be iteratively changed based on a negotiation with a controller server. The means to secure the scanning mechanism and the reboot mechanism may be a secure enclave or a trusted execution environment. The scanning mechanism may receive the reboot packet from a controller server. Further, in embodiments, the scanning mechanism may scan network data for the reboot packet. The payload may comprise reboot code. The reboot code may be located on a physical media including CD, DVD, flash, or any combination thereof. In examples, reboot code may be located burned into a private memory of a processor. The computing device may be compromised in response to a malware or an unauthorized software. The packet type may be undetectable by the malware.

Example 5

A tangible, non-transitory, computer-readable medium comprising code is described here. The code is to direct a processor to negotiate a reboot packet type and payload and receive a reboot packet from a controller server. The code is also to direct a processor to analyze the reboot packet at a secure enclave.

In examples, a compromised server may be rebooted to a known state in response to analyzing the reboot packet at a secure enclave. The reboot packet may be iteratively changed in response to the negotiation. A network traffic may be scanned to detect the reboot packet. A payload may be code to reboot a compromised server to a known state. The secure enclave may be scaled based on a processor of a compromised server. Further, in examples, the reboot packet may be sent from the controller server to a compromised server. Analyzing the reboot packet may include verifying the reboot packet via public key encryption. The reboot packet may be signed with a private key of the controller server. The reboot packet may comprise a time stamp and a string negotiated by the compromised server and the controller server.

While the present techniques have been described with respect to a limited number of embodiments, those skilled in the art will appreciate numerous modifications and variations therefrom. It is intended that the appended claims cover all such modifications and variations as fall within the true spirit and scope of this present techniques.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present techniques.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the present techniques may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

Reference throughout this specification to "one embodiment" or "an embodiment" means that a particular feature, structure, or characteristic described in connection with the embodiment is included in at least one embodiment of the present techniques. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the present techniques as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. An apparatus for regaining operational control of compromised remote servers, comprising:
   a secure enclave of a remote server, wherein the secure enclave comprises a scanning mechanism and a reboot mechanism, and wherein the secure enclave is to negotiate a packet type and a payload of a reboot packet with a controller server, wherein the reboot packet is unique between the controller server and the remote server for a single use and a validity of the reboot packet is determined via cryptographic protocols, and in response to the scanning mechanism detecting the valid reboot packet the reboot mechanism is to reboot the remote server.

2. The apparatus of claim 1, wherein the reboot packet type is iteratively changed based on a negotiation with the controller server.

3. The apparatus of claim 1, wherein the secure enclave is a trusted execution environment.

4. The apparatus of claim 1, wherein the scanning mechanism is to receive the reboot packet from a controller server.

5. The apparatus of claim 1, wherein the scanning mechanism scans network data for the reboot packet.

6. The apparatus of claim 1, wherein the payload comprises reboot code.

7. The apparatus of claim 1, wherein the reboot code is located on a physical media including CD, DVD, flash, or any combination thereof.

8. The apparatus of claim 1, wherein the reboot code is located burned into a private memory of a processor.

9. The apparatus of claim 1, wherein the computing device is compromised in response to a malware or an unauthorized software.

10. A method for regaining operational control of compromised remote servers, comprising:
negotiating a packet type and payload of a reboot packet between a secure enclave of a remote server and a controller server, wherein the reboot packet is unique between the controller server and the remote server for a single use and a validity of the reboot packet is determined via cryptographic protocols;
receiving the reboot packet from the controller server; and
analyzing the reboot packet at the secure enclave.

11. The method of claim 10, comprising rebooting a compromised server to a known state in response to analyzing the reboot packet at the secure enclave.

12. The method of claim 10, comprising iteratively changing the reboot packet in response to the negotiation.

13. The method of claim 10, comprising scanning the network traffic to detect the reboot packet.

14. The method of claim 10, wherein the payload is code to reboot a compromised server to a known state.

15. The method of claim 10, comprising scaling the secure enclave based on a processor of a compromised server.

16. The method of claim 10, wherein the reboot packet is sent from the controller server to a compromised server.

17. The method of claim 10, wherein analyzing the reboot packet includes verifying the reboot packet via public key encryption.

18. A system for regaining operational control of compromised remote servers, comprising:
a network connection;
a memory that is to store instructions and that is communicatively coupled to the network connection; and
a processor communicatively coupled to the network connection and the memory, wherein when the processor is to execute the instructions, the processor is to:
negotiate a packet type and payload of a reboot packet between a controller server and a reboot and scanning mechanism within a secure enclave of a remote server, wherein the reboot packet is unique between the controller server and the remote server for a single use and a validity of the reboot packet is determined via cryptographic protocols;
receive the reboot packet; and
analyze the reboot packet at the secure enclave.

19. The system of claim 18, wherein the reboot packet type is iteratively changed based on a negotiation with the controller server.

20. The system of claim 18, wherein the secure enclave is a trusted execution environment.

21. The system of claim 18, wherein the scanning mechanism is to receive the reboot packet from the controller server.

22. The system of claim 18, wherein the scanning mechanism is to scan network data for the reboot packet.

23. The system of claim 18, wherein the payload comprises reboot code.

24. The system of claim 18, wherein a reboot of the remote server is performed based on a valid reboot packet.

25. The system of claim 18, wherein a reboot code for a reboot is located burned into a private memory of a processor or located on a physical media including CD, DVD, flash, or any combination thereof.

* * * * *